United States Patent Office 3,010,664
Patented Nov. 28, 1961

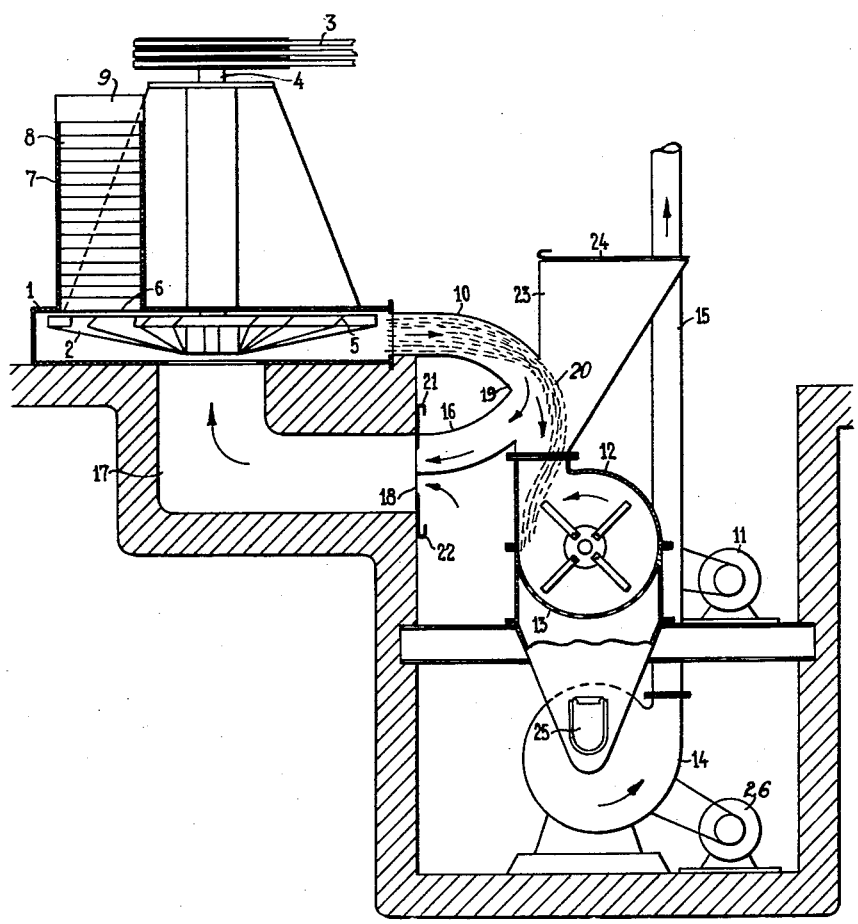

3,010,664
DISINTEGRATOR DEVICE
Lars Edvard Waenerlund, Carcavelos, Portugal, assignor to Svenska Tandsticks Aktiebolaget, Jonkoping, Sweden
Filed July 13, 1959, Ser. No. 826,523
Claims priority, application Sweden July 12, 1958
1 Claim. (Cl. 241—48)

This invention relates to improvements in disintegrator devices, and specially to such devices for the cutting, grinding, milling or other disintegration or crushing of a material, where a great quantity of air will be required for the pneumatic conveyance of the material out of the space in the machine, where the material is disintegrated. Particularly the invention will be applicable to machines for the cutting and disintegration of shavings for particle boards. Such machines have a big wheel, provided with knives, and for the transport of the cut shavings from the wheel it is required that a strong current of air is blown through the space containing the knife wheel. The shavings may be conveyed to an apparatus for their further disintegration and then conveyed by a fan through a transport duct to the place for the use of the shavings. This device suffers from the disadvantage that, the fan, the transport duct and possible apparatus for the further disintegration of the shavings are to be dimensioned for the big air current, which is required for the removal of the cut shavings or other disintegrated material out of the knife wheel, although a far less current of air could be sufficient for the further conveyance of the material. Also the power demand will be greater in this manner.

The primary object of the invention is to provide means in such a disintegrator device for the sucking back to the disintegrator member of a portion of the air in an outlet duct before said transport duct, in order to decrease the air quantity to be transported through the transport duct, so that said transport duct may be given a thinner dimension and the power demand decreased.

With the foregoing and other objects in view, my invention comprises certain novel constructions, combinations and arrangements of parts, as will be hereinafter fully described, illustrated in the accompanying drawing and more particularly pointed out in the appended claim.

The figure, shown in the drawing, is a partly sectional side view of a machine, constructed in accordance with the present invention, for the cutting, disintegration and pneumatic transport of shavings for particle boards.

In the drawing 1 designates the casing of the very disintegrator member which consists of a knife and fan wheel 2 arranged on a vertical and rotatably journalled shaft 4, which is driven from a motor, not shown, by means of a cone belt transmission 3. The knife wheel is comprised of a number of radially arranged tilted knives 5 with upturned edges. Above the knife and fan wheel the casing has an aperture 6 surrounded by a box 7, into which wooden pieces 8 are to be introduced through an opening 9 said aperture and box therefor forming an intake for material to be disintegrated. Said knife and fan wheel functions as a fan and rotates the air so that a strong current of air will move the shaving material through an outlet duct 10 connected to an orifice in the side of the casing 1 and on the pressure side of the disintegrator member. This outlet duct conveys the material current to a hammer mill 12, driven by a motor 11, for the further disintegration of the shavings, and then the air and the shavings are sucked through the grid bottom 13 of the hammer mill by a fan 14, driven by a motor 26, and blown further through a transport duct 15 to a consumption or storing place for the shavings.

For the transport of the shavings through the hammer mill 12 and the transport duct 15 it requires only a fraction of the quantity of air which is needed for the conveyance out of the disintegrator member 1–5 of the shavings as cut in said member. To avoid the need of dimensioning the hammer mill 12, the transport fan 14 and the transport duct 15 for the entire quantity of air from the disintegrator member the outlet duct 10 is in accordance with the invention connected by means of a branched return air duct 16 to an aspiration duct 17 said duct 17 forming an axial inlet below and on the suction side of the knife wheel 2, so that the air will be sucked into said wheel. A portion of the air in the outlet duct 10 will therefore be divided out through said return air duct 16 and fed back to the disintegrator member 2. The quantity of air, which is conveyed through the hammer mill 12, the fan 14 and the transport duct 15, is compensated for by a supply of fresh air to the duct 17 through a special air inlet 18 spaced from the intake 6, 7 for material to be disintegrated.

To get the air as free from shavings as possible, the air is returned to the disintegrator member through the return air duct 16, said outlet duct 10 forming a tube bend and said air duct being connected to the outlet duct 10 with a sharp-edged opening in the wall of said tube bend situated radially inwards relative to the bend center of the tube bend. Due to its inertia the current 20 of shavings will here leave said inner surface, so that air, in the main free from shavings, will by making a very sharp deviation to escape the shavings be introduced in the return air duct 16 due to the suction effect of the knife wheel 2.

The quantity of returned air and that of aspiration air may be regulated by means of a damper 21 in the return air duct and a damper 22 in the opening 18 respectively.

In another manner produced shavings may be introduced in the hammer mill 12 and the transport duct 15 through a funnel 23, as opening into the outlet duct 10. The upturned opening of said funnel may be closed by means of a sliding lid 24.

25 designates a damper in an opening in the casing of the fan 14, through which additional air may be introduced in the fan 14 and thereby in the transport duct 15. Only a fraction of the quantity of air, which is required for a sure conveyance of the shavings through the transport duct is hereby needed to be conveyed through the hammer mill 12. Especially when supplying shavings through the funnel 23 additional air must be supplied to the fan and the transport duct by opening the damper 25.

What I claim is:

In a disintegrator device comprising a casing, in said casing a combined disintegrator and fan member, an intake for solid material to be disintegrated, an inlet for fresh air, an outlet duct for conducting away the disintegrated material together with air, from the outer end of said outlet duct, a transport duct requiring a reduced quantity of air for the further transport of air as well as a recirculator device for recirculating the air not required for said further transport, said recirculator device comprising a bend of said outlet duct for forcing the passing disintegrated material from the center towards the outer curve of the bend due to centrifugal force and in this way partly separating the material from air and a return air duct connecting a point on the inner curve of said bend with said casing on the suction side of the disintegrator and fan member for drawing back to the casing the portion of the material free air in the outlet duct not required for the transport duct.

(References on following page)

References Cited in the file of this patent

UNITED STATES PATENTS

| | | |
|---|---|---|
| 204,849 | Sherwin | June 11, 1878 |
| 619,353 | Schutz | Feb. 14, 1899 |
| 1,104,121 | Knoblock | July 21, 1914 |
| 1,135,594 | Liggett | Apr. 13, 1915 |
| 1,527,818 | O'Neill | Feb. 24, 1925 |
| 1,621,571 | Witz | Mar. 22, 1927 |
| 2,417,078 | Jones | Mar. 11, 1947 |

FOREIGN PATENTS

| | | |
|---|---|---|
| 8,054 | Great Britain | June 3, 1887 |
| 141,052 | Germany | May 5, 1903 |
| 323,472 | Great Britain | Dec. 30, 1929 |
| 340,732 | Germany | June 27, 1920 |
| 696,181 | Great Britain | Aug. 26, 1953 |